United States Patent [19]
Roberts

[11] Patent Number: 5,828,156
[45] Date of Patent: Oct. 27, 1998

[54] ULTRASONIC APPARATUS

[75] Inventor: Allan J. Roberts, Poughquag, N.Y.

[73] Assignee: Branson Ultrasonics Corporation, Danbury, Conn.

[21] Appl. No.: 731,954

[22] Filed: Oct. 23, 1996

[51] Int. Cl.$^6$ .................................................. H01L 41/08
[52] U.S. Cl. ........................................... 310/317; 310/323
[58] Field of Search ..................................... 310/317, 323, 310/325, 26; 318/116

[56] References Cited

U.S. PATENT DOCUMENTS

| | | | |
|---|---|---|---|
| 2,891,176 | 6/1959 | Branson | 310/317 |
| 3,113,225 | 12/1963 | Kleesattel et al. | 310/26 |
| 3,315,102 | 4/1967 | Quint et al. | 310/317 |
| 3,562,041 | 2/1971 | Robertson | 156/73 |
| 3,839,698 | 10/1974 | Ehrlich | 310/317 X |
| 4,554,477 | 11/1985 | Ratcliff | 310/316 |
| 4,651,043 | 3/1987 | Harris et al. | 310/323 |
| 4,786,356 | 11/1988 | Harris . | |

FOREIGN PATENT DOCUMENTS

| | | |
|---|---|---|
| 0711626 | 5/1996 | European Pat. Off. . |
| 60-68926 | 4/1985 | Japan . |
| 62-273832 | 11/1987 | Japan . |
| 62-273833 | 11/1987 | Japan . |

*Primary Examiner*—Mark O. Budd
*Attorney, Agent, or Firm*—Polster, Lieder, Woodruff & Lucchesi

[57] ABSTRACT

In an ultrasonic apparatus a plurality of piezoelectric electroacoustic transducers (10, 12) are mechanically coupled to a horn (14) for providing ultrasonic vibrations thereto, and the transducers are energized in parallel from a common electrical power supply (28). In order to avoid the presence of circulating currents among the transducers, transformer balancing units (30) are connected in circuit with each of the transducers. Since the use of parallel connected piezoelectric transducers increases the total circuit capacitance, series connected capacitors (32, 34) are provided to restore the circuit capacitance to a value required for the resonant circuit condition.

17 Claims, 2 Drawing Sheets

ULTRASONIC APPARATUS

BACKGROUND OF THE INVENTION

This invention refers to an ultrasonic apparatus and more specifically concerns a system in which vibrations in the ultrasonic frequency range are applied by means of a horn to a work-piece, typically a thermoplastic workpiece, to effect welding, seaming, cutting or the like.

Apparatus of the type indicated are well known and comprise three main components, namely a horn, also termed solid horn, concentrator, tool, mechanical amplitude transformer, resonator, sonotrode, etc., an electroacoustic transducer, and a power supply. The power supply receives electrical energy at line frequency and provides high frequency electrical energy which is supplied to the electroacoustic transducer in which the supplied energy is converted to mechanical vibrations which, in turn, are coupled to the input surface of the horn. The vibrations travel longitudinally through the body of the horn to an output surface disposed opposite the input surface. Depending upon the configuration of the horn, the vibrations of the same or increased amplitude are coupled to a workpiece with which the output surface is in forced engagement.

The frequency of the vibratory system is determined primarily by the horn which is dimensioned to be resonant at a predetermined frequency for the vibrations traveling therethrough from the input to the output surface. The operating frequency typically is in the range between 16 kHz and 100 kHz. In view of the efficient power conversion most electroacoustic transducers employ a stack of piezoelectric discs for converting the electrical power applied to mechanical vibrations. The transducer also is designed to be resonant at the frequency for which the horn is dimensioned.

On account of the need to process or weld ever larger work-pieces, the horns have become more massive and generally are driven by a single transducer which is centered upon the input surface of the horn. While the total power which can be applied to a horn is limited by the mechanical stress to which a horn can be subjected, it is limited even more so by the power dissipation or heat losses within the transducer. For instance, the temperature must be kept below the depolarization temperature of the piezoelectric material. Also the mounting of the active transducer portion includes polymeric rings. One other problem evident in making a larger horn concerns the reduction of the motional amplitude at the horn output surface with increasing lateral distance away from the central area where the transducer is coupled to the horn. Various attempts have been made to overcome this problem, see for instance U.S. Pat. No. 4,651,013 issued to E. A. Harris et al., dated Nov. 22, 1988, which shows closely spaced horns for welding workpieces having an extended width.

Therefore, in order to provide for the use of larger horns while obtaining a substantially uniform motional output along the horn output surface, as well as providing greater ultrasonic power from a single horn, there has been the desire to couple a plurality of transducers to the input surface of the horn. Several problems arise when considering such an arrangement of driving transducers in parallel. The transducers as manufactured are not completely uniform, i.e., their characteristics vary. Transducers using piezoelectric conversion means essentially are capacitive devices and large circulating currents can be present when connecting such devices in parallel to a common power supply. These currents will flow among the transducers as a result of variations in the driving voltage for providing the same motional output. Moreover, motional input from the horn reflects itself as a voltage across a piezoelectric stack, causing one or more transducers to become a voltage source. The result will be unpredictable motion and electrical current conditions with the attendant heat dissipation in the transducers, instead of an orderly and predictable motion pattern, and uniform and known current flow through the transducers.

While the prior art, notably EP 0 711 626 A1 in the name of W. Herrmann, filed 14 Oct. 1995, entitled "Vorrichtung zum Ultraschallbearbeiten eines Werkstuecks", discloses an arrangement in which a plurality of piezoelectric transducers are coupled by means of coupling (or booster) horns to the input surface of a horn, this publication fails to recognize the problems noted above.

BRIEF SUMMARY OF THE INVENTION

The improvement made and disclosed in the present invention concerns the use of balancing transformer means in the electrical circuit from the electrical power supply, or generator, to the piezoelectric transducers in order to suppress the existence of circulating currents between the transducers, which currents would be present in the absence of these balancing means. The balancing means ensure that each transducer operates at its proper operating voltage despite differences arising from the manufacturing process and materials used. In addition, the present invention provides for the use of series connected capacitors to compensate for the increase in capacitance presented to the power supply when transducers of the type noted are connected in parallel. It is more economical to manufacture a standardized power supply for use in connection with one or more transducers and provide capacitance compensation when the power supply is used to drive a plurality of parallel connected transducers. In a typical embodiment of the present invention, a compensating capacitor is coupled in series between the power supply and each transducer, the value of the capacitor being a function of the quantity of parallel connected transducers and the capacitance required to retain the resonant frequency condition.

One of the important objects of this invention, therefore, is the provision of an ultrasonic apparatus for driving a large horn by coupling a plurality of transducers to its input surface.

Another important object of this invention is the provision of an ultrasonic apparatus in which a horn is driven in its resonant condition by a plurality of parallel connected transducers.

Another important object of this invention is the provision of an ultrasonic apparatus in which a plurality of transducers are coupled to a single horn and the transducers are electrically connected in parallel and energized by a single power supply.

A further significant object of this invention is the provision of an ultrasonic apparatus in which a plurality of electroacoustic transducers are connected in parallel to an electrical power supply and are coupled to the input surface of a horn for providing vibrations to the horn, and means are provided to suppress the existence of circulating currents between the parallel connected transducers.

A still further object of this invention is the provision of an ultrasonic apparatus in which a plurality of electroacoustic transducers are coupled in parallel to a single power supply and balancing transformer means are used to inhibit the flow of circulating currents as the transducers drive a single horn.

Another and further object of this invention is the provision of an ultrasonic apparatus in which a plurality of electroacoustic transducers are coupled in parallel to a single power supply and series connected capacitors are used to compensate for the increased capacitance resulting from parallel connected piezoelectric transducers.

Still another and further object of this invention is the provision of an ultrasonic horn having a plurality of transducers coupled to its input surface, the transducers being driven in parallel and in-phase, thereby providing a horn transmitting greater ultrasonic power than would be available from an identical horn having but a single transducer coupled thereto.

Further and still other objects of this invention will become more clearly apparent from the following description when read in conjunction with the accompanying drawings.

DETAILED DESCRIPTION OF THE INVENTION

Figure 1:
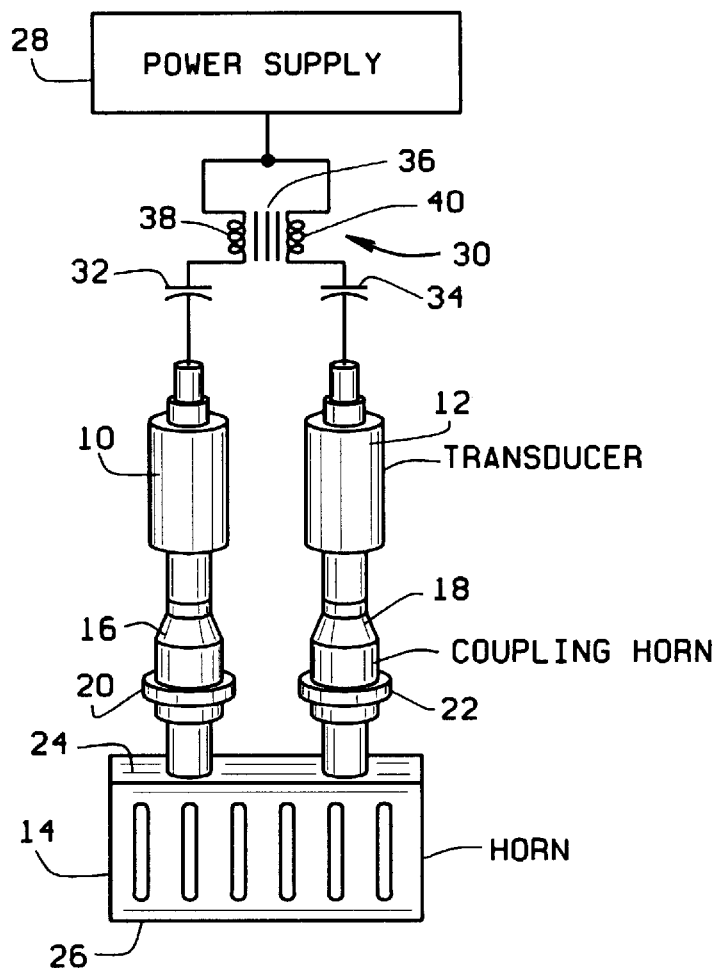
FIG. 1 is a schematic illustration showing a plurality of transducers coupled to a single horn and the transducers being connected in parallel to a power supply using balance transformer means.

Referring now to the figures and FIG. 1 in particular, a typical embodiment of the invention is shown wherein two electroacoustic transducers are mechanically coupled to a single horn. As shown, a pair of piezoelectric transducers 10 and 12 is coupled to a slotted bar horn 14 by means of respective intermediate coupling horns 16 and 18, the latter being known also as booster horns or couplers. The in phase mechanical vibrations provided by the transducers 10 and 12, responsive to high frequency electrical energy applied thereto, are transmitted to the respective coupling horns 16 and 18, which, depending upon the application, may be constructed to provide a mechanical gain, such as a ratio of 1 to 1.2, or similar value. The horns 16 and 18 are provided with a respective mounting flange 20 and 22 for supporting the transducer and horn assembly in a stationary housing, all as is well known in the art.

The vibrations transmitted from the transducers through the coupling or booster horns 16 and 18 are coupled to the input surface 24 of the horn 14 and are transmitted through the horn 14 to the oppositely disposed output surface 26, which, during operation, is in forced engagement with a workpiece (not shown) to which the vibrations are applied to effect welding, cutting or seaming of thermoplastic material, or a similar process.

The high frequency electrical energy provided by the power supply 28 is fed to each of the transducers 10 and 12, electrically connected in parallel, via a balancing transformer means 30 and a respective series connected capacitor 32 and 34, one capacitor connected in series with the electrical connection to each of the transducers. The balancing transformer means 30 is known also as "balun" standing for "balancing unit". The balancing means 30 comprises a magnetic core 36 and a pair of identical windings 38 and 40, also termed hereafter primary winding and secondary winding, respectively. In order to reduce leakage inductance between the windings, the windings most suitably are wound in a bifilar manner.

The need for the balancing transformer means arises from the following consideration. Typically, the transducers comprise commercially available piezoelectric transducers, such as Branson Ultrasonics Corporation models 105 or 502, each designed for operation at 20 kHz and a maximum power rating of 3 kW. The energizing voltage for providing maximum motional excursion at the output surface of the transducer is 930 volt rms. The current flow through a transducer may vary between zero and 3.5 ampere depending on the load impedance. At 930 volt rms the output motion is approximately 20 microns with a ±10 per cent variation resulting from material and manufacturing tolerances. The maximum difference in terminal voltage for the same motional amplitude, therefore, can be 186 volt. Such a voltage difference, as noted before, can give rise to large circulating currents flowing between the transducers. The balancing unit 30 assures a balanced condition by providing equal current flow through the transducers, hence eliminating the possibility of circulating currents. The wire size of the windings must be selected for the full load current noted above and the maximum voltage appearing across a winding input is 93 volt, i.e. ten percent variation of the driving voltage. In a typical embodiment, twenty-two turns were used for each winding 38 and 40 and as stated, in order to obtain proper balance, both windings are substantially identical.

The use of the in series connected capacitors 32 and 34 arises from the following consideration. The power supply 28 is designed for operation at a predetermined frequency, typically 20 kHz, at which the entire system is resonant. A single piezoelectric transducer of the models stated has a stack of piezoelectric wafers or disks clamped together and exhibits an input or clamped capacitance of 0.02 $\mu$F. An inductor is provided in the power supply which assures resonance based on the stated capacitance. Upon connecting two transducers in parallel as shown, the capacitance of the circuit is doubled, i.e., becoming 0.04 $\mu$F. By providing series coupled capacitors of 0.02 $\mu$F. each, the value of 0.02 $\mu$F for the total circuit capacitance is restored. When three transducers are used as seen in FIG. 3, each series connected capacitor in the present example will have a value of 0.01 $\mu$F to provide in each branch a capacitance value of 0.02/3= 0.0067 $\mu$F, comprising 0.02 $\mu$F for the transducer and 0.01 $\mu$F for the capacitor.

Figure 2:
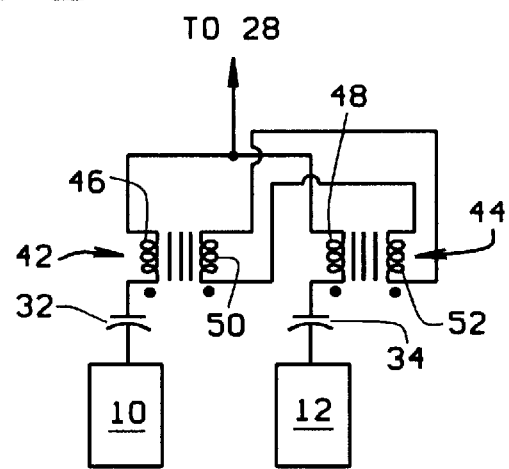
FIG. 2 is a schematic diagram showing a variation of the transformer means depicted in FIG. 1.

FIG. 2 shows a modification of the arrangement depicted in FIG. 1. Instead of a single balancing unit 10, two balancing transformer means 42 and 44 are used. One, or primary, winding 46 of the first balancing unit 42 is connected in circuit with the transducer 10, while the other, or primary, winding 48 of the second balancing unit 44 is connected in circuit with the transducer 12. Both remaining, or secondary, windings 50 and 52 are connected in series with one another. It should be noted that while both windings of a respective balancing unit may be identical, it is particularly important that the respective primary windings of the balancing units and the respective secondary windings be identical in order to assure a balanced condition.

Figure 3:
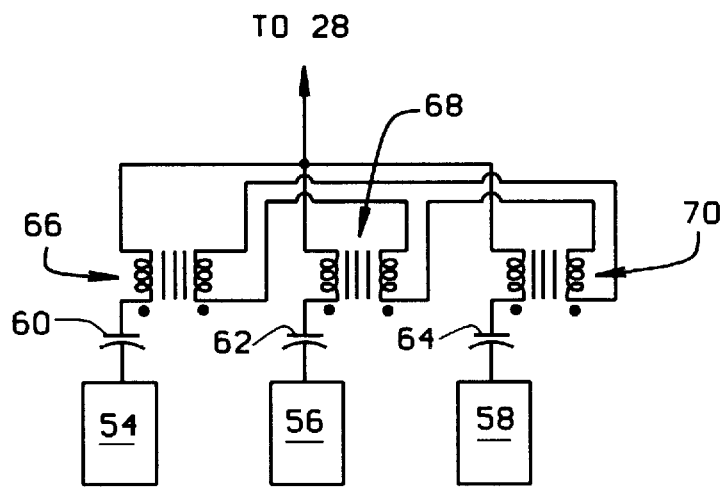
FIG. 3 is a schematic circuit diagram illustrating the use of three parallel connected transducers.

FIG. 3 depicts the use of three transducers connected in parallel to a common power supply and coupled mechanically to a single horn. As seen, there are three transducers 54, 56 and 58, three series connected compensating capacitors 60, 62 and 64, and three balancing units 66, 68 and 70. Each of the balancing units, as explained, has two windings, a first or primary winding connected in series with a respective transducer electrical input, and the respective other windings, or secondary windings, of the balancing units are connected in series with one another. The balancing units must be substantially identical.

Using still more transducers in parallel, the teachings noted above can be followed so that no further explanation is required.

Figure 4:
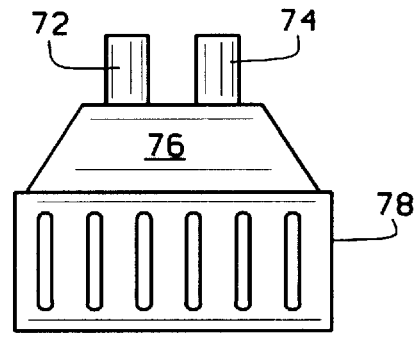
FIG. 4 is a schematic illustration showing the use of a single coupling horn for coupling a plurality of transducers to a horn.

FIG. 4 depicts an alternative arrangement wherein the transducers 72 and 74 are mechanically coupled to a common coupling horn 76, which, in turn, is coupled to an output horn 78. The electrical circuit, not shown, remains as stated above. In another modification, the coupling horns may be absent and the transducers directly coupled to the output horn 14 or 78.

It will be apparent, moreover to those skilled in the art, that the series connected capacitors 32, 34 and 60, 62 and 64 can be omitted if the power supply is designed initially to operate with a predetermined quantity of transducers. In this case the value of the inductance, not shown, provided in the power supply is selected to be commensurate with the total capacitance represented by the quantity of transducers to assure resonance.

Figure 5:
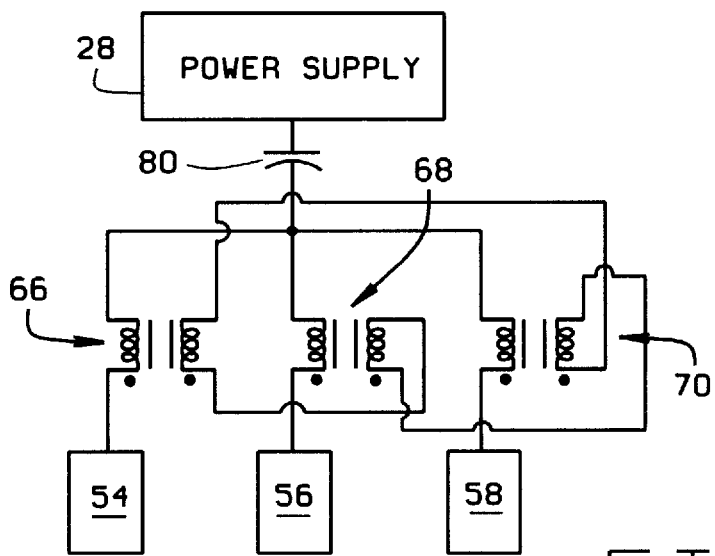
FIG. 5 is a schematic illustration showing a modification of the electrical circuit.

FIG. 5 represents a modification of the circuit shown in FIG. 3. The three individual capacitors 60, 62 and 64, that is one capacitor in circuit with each transducer, are replaced by a single capacitor 80, the value of which is equal to the sum of the capacitance of the three capacitors 60, 62 and 64.

While there have been described and illustrated several embodiments of the invention and modifications thereof, it will be apparent to those skilled in the art that various further changes and modifications can be devised without deviating from the broad principle of this invention, which shall be limited only by the scope of the appended claims.

I claim:

1. An ultrasonic apparatus for delivering vibratory energy in the ultrasonic frequency range to a workpiece comprising:

a horn dimension to be mechanically resonant for vibrations of predetermined frequency in the ultrasonic frequency range;

a plurality of piezoelectric transducers coupled to said horn for rendering said horn resonant at said frequency by providing in-phase mechanical vibrations to said horn;

a power supply connected to said transducers for providing electrical energy of said frequency to said transducers and causing said transducers to be energized in parallel, and means for balancing the electrical current flow through said transducers coupled in circuit between said power supply and said transducers.

2. An ultrasonic apparatus for delivering vibratory energy in the ultrasonic frequency range to a workpiece comprising:

a horn dimensioned to be mechanically resonant for vibrations of predetermined frequency in the ultrasonic frequency range traveling longitudinally therethrough from an input surface to an oppositely disposed output surface;

a plurality of piezoelectric electroacoustic transducers spaced along and mechanically coupled to the input surface of said horn for providing when energized in-phase mechanical vibrations of said frequency to said input surface;

a power supply electrically connected to said transducers for providing high frequency electrical energy of said predetermined frequency and causing said transducers to be energized in parallel, and balancing transformer means coupled in the connection between said power supply and each of said transducers for causing substantially equal electrical current flow through said transducers and thereby substantially inhibiting circulating electrical currents flowing through said transducers.

3. An ultrasonic apparatus as set forth in claim 2, and a coupling horn mechanically coupling each of said transducers to said horn.

4. An ultrasonic apparatus as set forth in claim 2, said balancing transformer means comprising a magnetic core having a pair of substantially identical windings.

5. An ultrasonic apparatus as set forth in claim 2, said balancing transformer means comprising a plurality of magnetic cores, each core having a primary winding and a secondary winding, said primary windings being substantially identical and a respective primary winding being serially connected in the circuit between said power supply and a respective transducer, and said secondary windings being substantially identical and connected in series with one another.

6. An ultrasonic apparatus as set forth in claim 5, each primary winding and secondary winding associated with a respective core being wound in a bifilar manner.

7. An ultrasonic apparatus as set forth in claim 5, said primary windings and secondary windings being substantially identical with one another.

8. An ultrasonic apparatus as set forth in claim 2, and capacitor means connected in series with the electrical circuit from said power supply and balancing transformer means to said transducers for reducing the total electrical circuit capacitance to a value commensurate with the predetermined resonant frequency.

9. An ultrasonic apparatus as set forth in claim 8, said capacitor means comprising a respective capacitor connected in series with the electrical circuit to each of said transducers, and said capacitors reducing the total circuit capacitance manifest at said power supply to a value substantially equal to the clamped capacitance of one of said transducers.

10. An ultrasonic apparatus set forth in claim 8, said capacitor means comprising a single capacitor.

11. An ultrasonic apparatus as set forth in claim 3, said horn being a slotted bar horn dimensioned to be resonant at a predetermined frequency in the range from 16 KHz to 100 KHz.

12. An ultrasonic apparatus as set forth in claim 3, said coupling horn being a single unit common with said transducers.

13. An ultrasonic apparatus for delivering vibratory energy in the ultrasonic frequency range to a workpiece comprising:

a horn dimensioned to be mechanically resonant for vibrations of predetermined frequency in the ultrasonic frequency range traveling longitudinally through said horn from an input surface to an oppositely disposed output surface;

a plurality of piezoelectric transducers and a plurality of coupling horns, each of said transducers mechanically coupled to a respective coupling horn and said coupling horns being spaced along said input surface of said horn and mechanically coupled thereto for causing said input surface to receive said vibrations of said predetermined frequency from said transducers and transmitted through said coupling horns;

a power supply electrically connected to said transducers for providing high frequency electrical energy of said predetermined frequency to said transducers and causing said transducers to be driven in parallel and provide said vibrations, and respective balancing transformer means associated with each of said transducers, each transformer means having a primary winding and a secondary winding, a respective primary winding being coupled serially in the electrical connection from said power supply to a respective transducer with which said transformer means is associated, and the secondary windings of said transformer means being electrically connected in series with one another.

14. An ultrasonic apparatus as set forth in claim 13 and capacitor means coupled in series with the electrical connection from said power supply to said transformer means and said transducers for causing the capacitance manifest at said power supply to be less than the sum of the clamped capacitance of said plurality of transducers.

15. An ultrasonic apparatus for delivering vibratory energy in the ultrasonic frequency range to a workpiece comprising:

a horn dimensioned to be mechanically resonant for vibrations of predetermined frequency in the ultrasonic frequency range traveling longitudinally therethrough from an input surface to an oppositely disposed output surface;

a pair of piezoelectric electroacoustic transducers spaced along and mechanically coupled to the input surface of said horn for providing when energized in-phase mechanical vibrations of said frequency to said input surface for rendering said horn resonant;

a power supply electrically connected to said transducers for providing high frequency electrical energy of said predetermine frequency and causing said transducers to be energized in parallel;

balancing means coupled in the connection between said power supply and each of said transducers for causing substantially equal current flow through said transducers and inhibiting the presence of circulating electrical current flowing between said transducers, and said balancing means comprising a magnetic core provided with a pair of substantially identical windings, one of the windings coupled in series with the electrical circuit from said power supply to one of the transducers, and the other winding coupled in series with the electrical circuit from said power supply to the other one of the transducers.

16. An ultrasonic apparatus for delivering vibratory energy as set forth in claim 15, and a respective coupling horn mechanically coupling each of said transducers to said input surface.

17. An ultrasonic apparatus for delivering vibratory energy as set forth in claim 15, and said pair of windings being wound bifilarly.

* * * * *